US012016814B2

(12) United States Patent
Schmidt et al.

(10) Patent No.: US 12,016,814 B2
(45) Date of Patent: Jun. 25, 2024

(54) CARRIABLE COMPLEX REHABILITATION TECHNOLOGY SYSTEMS

(71) Applicant: Altimate Medical Holdings, Inc., Morton, MN (US)

(72) Inventors: Jeffrey Schmidt, Redwood Falls, MN (US); Matt Haugen, Hector, MN (US); Mark Schmitt, Atwater, MN (US); Wesley Ovre, Redwood Falls, MN (US)

(73) Assignee: ALTIMATE MEDICAL HOLDINGS, INC., Morton, MN (US)

( * ) Notice: Subject to any disclaimer, the term of this patent is extended or adjusted under 35 U.S.C. 154(b) by 716 days.

(21) Appl. No.: 17/062,712

(22) Filed: Oct. 5, 2020

(65) Prior Publication Data

US 2022/0104990 A1 Apr. 7, 2022

(51) Int. Cl.
*A61H 1/02* (2006.01)

(52) U.S. Cl.
CPC ... *A61H 1/0229* (2013.01); *A61H 2001/0233* (2013.01); *A61H 2201/0119* (2013.01); *A61H 2201/0157* (2013.01); *A61H 2201/0161* (2013.01); *A61H 2203/0487* (2013.01)

(58) Field of Classification Search
CPC .......... A61H 1/0229; A61H 2001/0233; A61H 2201/0119; A61H 2201/0157; A61H 2201/0161; A61H 2203/0487; A61G 7/1074; A61G 7/10
See application file for complete search history.

(56) References Cited

U.S. PATENT DOCUMENTS

| | | | | | |
|---|---|---|---|---|---|
| 339,650 | A * | 4/1886 | Hill | A63B 69/0064 | 482/69 |
| 1,703,375 | A * | 2/1929 | Volk | A63B 21/156 | 473/216 |
| 1,924,182 | A * | 8/1933 | Fritz | A63B 55/50 | 206/315.7 |
| 2,812,010 | A * | 11/1957 | Abdallah | A61H 3/008 | 482/69 |
| 3,966,202 | A * | 6/1976 | Cynamon | A63B 69/12 | 434/254 |
| 4,114,873 | A * | 9/1978 | Jones | A63B 69/0022 | 482/42 |

(Continued)

FOREIGN PATENT DOCUMENTS

SE 532606 C2 3/2010

OTHER PUBLICATIONS

International Search Report and Written Opinion for International Application No. PCT/US2021/053571, dated Apr. 12, 2022, 20 pgs.

*Primary Examiner* — Garrett K Atkinson
(74) *Attorney, Agent, or Firm* — Fredrikson & Byron, P.A.

(57) ABSTRACT

A complex rehabilitation technology system includes a frame and a complex rehabilitation technology device. This frame is movable between a collapsed carriable position and an expanded support position to facilitate portability or storage. The complex rehabilitation technology device is coupled to the frame. And, the complex rehabilitation technology device is configured to be operable when the frame is in the expanded support position. The complex rehabilitation system can be portable (e.g., configured for one-handed carrying).

17 Claims, 11 Drawing Sheets

(56) References Cited

U.S. PATENT DOCUMENTS

| | | | | | |
|---|---|---|---|---|---|
| 4,340,215 | A | * | 7/1982 | Murphy | A63B 21/4009 16/98 |
| 4,651,719 | A | | 3/1987 | Funk et al. | |
| 4,732,379 | A | | 3/1988 | Bodine-Reese et al. | |
| 4,744,578 | A | * | 5/1988 | Stearns | A61G 5/14 280/47.16 |
| 4,934,725 | A | | 6/1990 | Owens | |
| 4,976,623 | A | * | 12/1990 | Owsley | A63B 1/00 434/247 |
| 5,016,300 | A | | 5/1991 | Jandrakovic | |
| 5,033,460 | A | * | 7/1991 | Goldish | A61H 1/0218 606/241 |
| D326,437 | S | | 5/1992 | Kuhl et al. | |
| D327,041 | S | | 6/1992 | Kuhl et al. | |
| D329,833 | S | | 9/1992 | Andersson et al. | |
| 5,147,265 | A | * | 9/1992 | Pauls | A63B 23/12 482/115 |
| 5,147,286 | A | | 9/1992 | Meals | |
| 5,155,789 | A | | 10/1992 | Le Noane et al. | |
| 5,172,925 | A | | 12/1992 | Kendrick et al. | |
| 5,176,597 | A | * | 1/1993 | Bryne | A61H 3/008 482/54 |
| D339,315 | S | | 9/1993 | Lindkvist et al. | |
| 5,242,180 | A | | 9/1993 | Bergeron | |
| D347,604 | S | * | 6/1994 | Ernst | D12/132 |
| 5,399,138 | A | | 3/1995 | Jones | |
| 5,403,253 | A | * | 4/1995 | Gaylord | A63B 69/0064 482/142 |
| 5,417,472 | A | | 5/1995 | Elvinsson | |
| 5,464,383 | A | | 11/1995 | Padden et al. | |
| D367,024 | S | | 2/1996 | Moeller | |
| 5,489,258 | A | * | 2/1996 | Wohnsen | A61G 7/1051 602/5 |
| 5,526,893 | A | * | 6/1996 | Higer | A61H 3/04 482/68 |
| D372,890 | S | | 8/1996 | Ferm et al. | |
| 5,553,855 | A | * | 9/1996 | Balestrieri | A63B 69/0075 473/419 |
| 5,569,172 | A | | 10/1996 | Padden et al. | |
| 5,618,055 | A | * | 4/1997 | Mulholland | A61G 5/1094 602/5 |
| 5,626,540 | A | * | 5/1997 | Hall | A61H 1/0229 606/241 |
| 5,667,461 | A | * | 9/1997 | Hall | A63B 69/0064 482/54 |
| 5,746,688 | A | | 5/1998 | Prager | |
| 5,755,649 | A | | 5/1998 | Bimby | |
| D399,272 | S | * | 10/1998 | Zwonitzer | D21/683 |
| 5,941,807 | A | * | 8/1999 | Cassidy | A63B 21/4009 482/130 |
| 6,053,519 | A | * | 4/2000 | Poindexter | A61G 5/042 297/DIG. 10 |
| 6,099,447 | A | * | 8/2000 | Ramsaroop | A63B 21/153 482/127 |
| D448,706 | S | | 10/2001 | Ferm | |
| D501,432 | S | | 2/2005 | Moller | |
| 6,890,288 | B2 | * | 5/2005 | Bingham | A47D 13/046 482/69 |
| 6,941,595 | B1 | | 9/2005 | Michael | |
| 7,036,512 | B2 | * | 5/2006 | Harnois | A61G 5/128 601/24 |
| 7,131,936 | B2 | * | 11/2006 | Schlosser | A61H 3/008 482/8 |
| 7,134,678 | B2 | | 11/2006 | Lindkvist et al. | |
| 7,275,554 | B2 | * | 10/2007 | Mullholand | A61H 3/008 135/67 |
| 7,294,094 | B1 | * | 11/2007 | Howle | A61H 3/00 482/69 |
| 7,338,418 | B2 | * | 3/2008 | Erez | A63B 69/0059 482/148 |
| 7,341,543 | B2 | * | 3/2008 | Dandy | A63B 22/20 280/271 |
| D566,409 | S | | 4/2008 | Lindqvist et al. | |

| | | | | | |
|---|---|---|---|---|---|
| 7,354,412 | B2 | | 4/2008 | Verdonk et al. | |
| 7,400,245 | B1 | | 7/2008 | Johnson | |
| 7,404,567 | B2 | | 7/2008 | Moller | |
| D588,051 | S | | 3/2009 | Moller et al. | |
| D598,680 | S | | 8/2009 | Birk | |
| D602,405 | S | | 10/2009 | Skafdrup et al. | |
| 7,651,450 | B2 | * | 1/2010 | Wehrell | A63B 21/4007 482/129 |
| D609,138 | S | | 2/2010 | Skafdrup et al. | |
| 7,658,448 | B2 | | 2/2010 | Birk et al. | |
| 7,780,587 | B2 | * | 8/2010 | Thornton | A61H 3/04 119/770 |
| 7,996,935 | B1 | * | 8/2011 | Chen | A45F 3/24 5/120 |
| 8,007,418 | B2 | | 8/2011 | LeVert et al. | |
| 8,142,379 | B2 | | 3/2012 | Verdonk et al. | |
| 8,186,695 | B2 | | 5/2012 | Moller | |
| 8,186,756 | B2 | | 5/2012 | Jorgensen | |
| D681,357 | S | | 5/2013 | Sjostrand et al. | |
| D681,358 | S | | 5/2013 | Sjostrand et al. | |
| D696,162 | S | | 12/2013 | Skafdrup et al. | |
| D703,107 | S | | 4/2014 | Moller | |
| 8,794,252 | B2 | | 8/2014 | AlSayed et al. | |
| D729,534 | S | | 5/2015 | Ferm et al. | |
| D729,535 | S | | 5/2015 | Ferm et al. | |
| D729,536 | S | | 5/2015 | Ferm et al. | |
| D729,537 | S | | 5/2015 | Ferm et al. | |
| D744,909 | S | * | 12/2015 | Birk | D12/130 |
| 9,239,616 | B1 | * | 1/2016 | Carrell | G06F 3/011 |
| 9,259,603 | B2 | * | 2/2016 | Wireman | A63B 71/023 |
| 9,314,387 | B2 | | 4/2016 | AlSayed et al. | |
| 9,370,680 | B1 | * | 6/2016 | Macaulay | A63B 71/023 |
| 9,452,102 | B2 | * | 9/2016 | Ledea | A61H 3/04 |
| 9,649,243 | B2 | | 5/2017 | Johnson et al. | |
| 9,657,770 | B2 | | 5/2017 | Moller | |
| 9,662,526 | B2 | | 5/2017 | Agrawal et al. | |
| 9,827,154 | B2 | * | 11/2017 | Møller | A61G 5/10 |
| 9,931,257 | B2 | * | 4/2018 | Lokken | A61G 5/1094 |
| 10,052,252 | B2 | * | 8/2018 | Lin | A61B 5/389 |
| 10,179,258 | B1 | | 1/2019 | Sabbagh | |
| 10,220,246 | B2 | | 3/2019 | Lerihan | |
| 10,232,209 | B2 | * | 3/2019 | Pouchet | A63B 71/0622 |
| 10,232,210 | B2 | | 3/2019 | Pena-Ruiz | |
| 10,265,576 | B2 | | 4/2019 | Kamins | |
| 10,272,289 | B2 | | 4/2019 | Kamins | |
| 10,293,206 | B2 | | 5/2019 | Kamins | |
| 10,482,927 | B2 | * | 11/2019 | Huang | G11B 33/1453 |
| 10,576,009 | B2 | | 3/2020 | Richter et al. | |
| 10,639,220 | B1 | | 5/2020 | Smith | |
| 10,709,633 | B2 | * | 7/2020 | Kazerooni | A61H 3/008 |
| 11,083,924 | B2 | * | 8/2021 | Borisoff | A63B 23/03575 |
| 11,166,866 | B2 | * | 11/2021 | Ye | A63B 21/00181 |
| 11,458,061 | B1 | * | 10/2022 | Meincke, II | B25J 9/0006 |
| 2002/0135219 | A1 | | 9/2002 | Rogers | |
| 2003/0176229 | A1 | * | 9/2003 | Jacobys Schutte | A63B 69/3632 473/276 |
| 2004/0106886 | A1 | | 6/2004 | Verdonk et al. | |
| 2004/0267175 | A1 | * | 12/2004 | Harnois | A61G 5/14 602/5 |
| 2005/0034231 | A1 | | 2/2005 | Huang | |
| 2007/0015641 | A1 | * | 1/2007 | Demeniuk | A63B 21/4005 482/124 |
| 2009/0048549 | A1 | | 2/2009 | Verdonk et al. | |
| 2009/0165203 | A1 | | 7/2009 | Biersteker et al. | |
| 2010/0292053 | A1 | | 11/2010 | LeVert et al. | |
| 2011/0024374 | A1 | * | 2/2011 | Brown | F41B 5/14 211/85.7 |
| 2013/0263374 | A1 | | 10/2013 | Yamaguchi et al. | |
| 2014/0261363 | A1 | * | 9/2014 | Lu | F41B 4/00 124/78 |
| 2014/0302971 | A1 | | 10/2014 | Vining, III | |
| 2015/0035978 | A1 | | 2/2015 | Johnston | |
| 2016/0008195 | A1 | | 1/2016 | Lokken et al. | |
| 2016/0236032 | A1 | | 8/2016 | Kamins | |
| 2016/0296784 | A1 | * | 10/2016 | Kamins | A63B 21/154 |
| 2016/0296785 | A1 | * | 10/2016 | Kamins | A63B 69/0062 |

(56) References Cited

U.S. PATENT DOCUMENTS

| | | | | |
|---|---|---|---|---|
| 2018/0264316 | A1 | 9/2018 | Liu | |
| 2019/0030412 | A1 * | 1/2019 | Benet .................. | A63B 71/023 |
| 2019/0176008 | A1 * | 6/2019 | Antelme ............. | A63B 47/005 |

* cited by examiner

CARRIABLE COMPLEX REHABILITATION TECHNOLOGY SYSTEMS

TECHNICAL FIELD

This disclosure relates generally to carriable complex rehabilitation technology systems. Some such system embodiments include a complex rehabilitation technology device along with one or more features that can facilitate portability of that particular complex rehabilitation technology device.

BACKGROUND

Complex rehabilitation technology devices provide people with a disability or handicap with many health and social benefits. For example, one complex rehabilitation technology device is a stander. A stander can provide the benefits of standing to a disabled or handicap person not able to do so on his or her own. The health benefits on standing are well documented. Even where there is little, or no, control over the muscle groups that normally support a person in a standing posture, the standing posture itself can improve blood flow, increase bone density, improve flexibility and range of motion, and improve the person's sense of well-being by simply allowing that person to stand. Other types of complex rehabilitation technology devices are designed to assist other specific medical and functional needs of an individual living with a disability or handicap.

However, many complex rehabilitation technology devices define a large footprint that is not easily reduced due, at least in part, to the relatively large number of interconnected parts. This can make portability of such complex rehabilitation technology devices problematic and, in many cases, prohibitive. Despite the well documented health and social benefits, because such complex rehabilitation technology devices can be difficult to transport from one location to another this may reduce utilization and increase costs associated with complex rehabilitation technology devices.

SUMMARY

This disclosure in general provides embodiments relating to carriable complex rehabilitation technology systems. Such system embodiments can include a complex rehabilitation technology device along with one or more features that can facilitate portability of that particular complex rehabilitation technology device. As one example, some complex rehabilitation technology system embodiments disclosed herein can be selectively brought into a collapsed carriable position, having a relatively more compact footprint, that facilitates transportation of the complex rehabilitation technology device from one location to another. Accordingly, embodiments disclosed herein can provide various complex rehabilitation technology devices with increased portability and thereby increase utilization of complex rehabilitation technology devices.

One embodiment includes a complex rehabilitation technology system. This complex rehabilitation technology system embodiment includes a frame and a complex rehabilitation technology device. The frame is movable between a collapsed carriable position and an expanded support position. The complex rehabilitation technology device is coupled to the frame. And, the complex rehabilitation technology device is configured to be operable when the frame is in the expanded support position.

In a further embodiment of this complex rehabilitation technology system, the frame includes a tripod. The tripod includes a tripod base, a first leg, a second leg, and a third leg. The complex rehabilitation technology device is coupled to the tripod base. Each of the first leg, the second leg, and the third leg is hingedly attached to the tripod base. In this embodiment, at least two of the first leg, the second leg, and the third leg can be movable relative to the tripod base between the collapsed carriable position and the expanded support position. Also in this embodiment, the first leg, the second leg, and the third leg can be spaced further apart when in the expanded support position than when in the collapsed carriable position.

As one example, the complex rehabilitation technology device, of the complex rehabilitation technology system embodiments above, can be a stander. The stander can include a stander base, a trunk support, a first leg support and a second leg support, a first knee support and a second knee support, and a first foot support and a second foot support. The stander base can be coupled to the frame. The trunk support can be coupled to the stander base. The first leg support and the second leg support can each be coupled to the stander base. The first knee support and the first foot support can each be coupled to the first leg support. The second knee support and the second foot support can each be coupled to the second leg support.

Another embodiment includes a portable stander system. This portable stander system embodiment includes a frame and a stander device that is coupled to the frame. The frame includes a handle. The portable stander system is configured for one-handed carrying via the handle.

In a further embodiment of this portable stander system, the frame can be movable between a collapsed carriable position and an expanded support position. The stander device can be configured for one-handed carrying via the handle when the frame is in the collapsed carriable position. And, the stander device can be configured to be operable when the frame is in the expanded support position.

Another embodiment of a portable stander system includes a frame and a stander device that is coupled to the frame. The frame is collapsible to fit the portable stander system within an interior volume of a package of 100 liters.

The details of one or more examples are set forth in the accompanying drawings and the description below. Other features, objects, and advantages will be apparent from the description and drawings, and from the claims.

BRIEF DESCRIPTION OF DRAWINGS

The following drawings are illustrative of particular examples of the present invention and, therefore, do not limit the scope of the invention. The drawings are not necessarily to scale and are intended for use in conjunction with the explanations in the following detailed description. Examples of the present invention will hereinafter be described in conjunction with the appended drawings.

FIG. 1 shows a frame of the complex rehabilitation technology system in an expanded support position.

FIG. 7 shows the frame embodiment in an expanded support position, and

FIG. 8 shows the frame embodiment in a collapsed carriable position.

DETAILED DESCRIPTION

The following detailed description is exemplary in nature and is not intended to limit the scope, applicability, or configuration of the invention in any way. Rather, the following description provides some practical illustrations for implementing examples of the present invention. Those skilled in the art will recognize that many of the noted examples have a variety of suitable alternatives.

Figure 1:
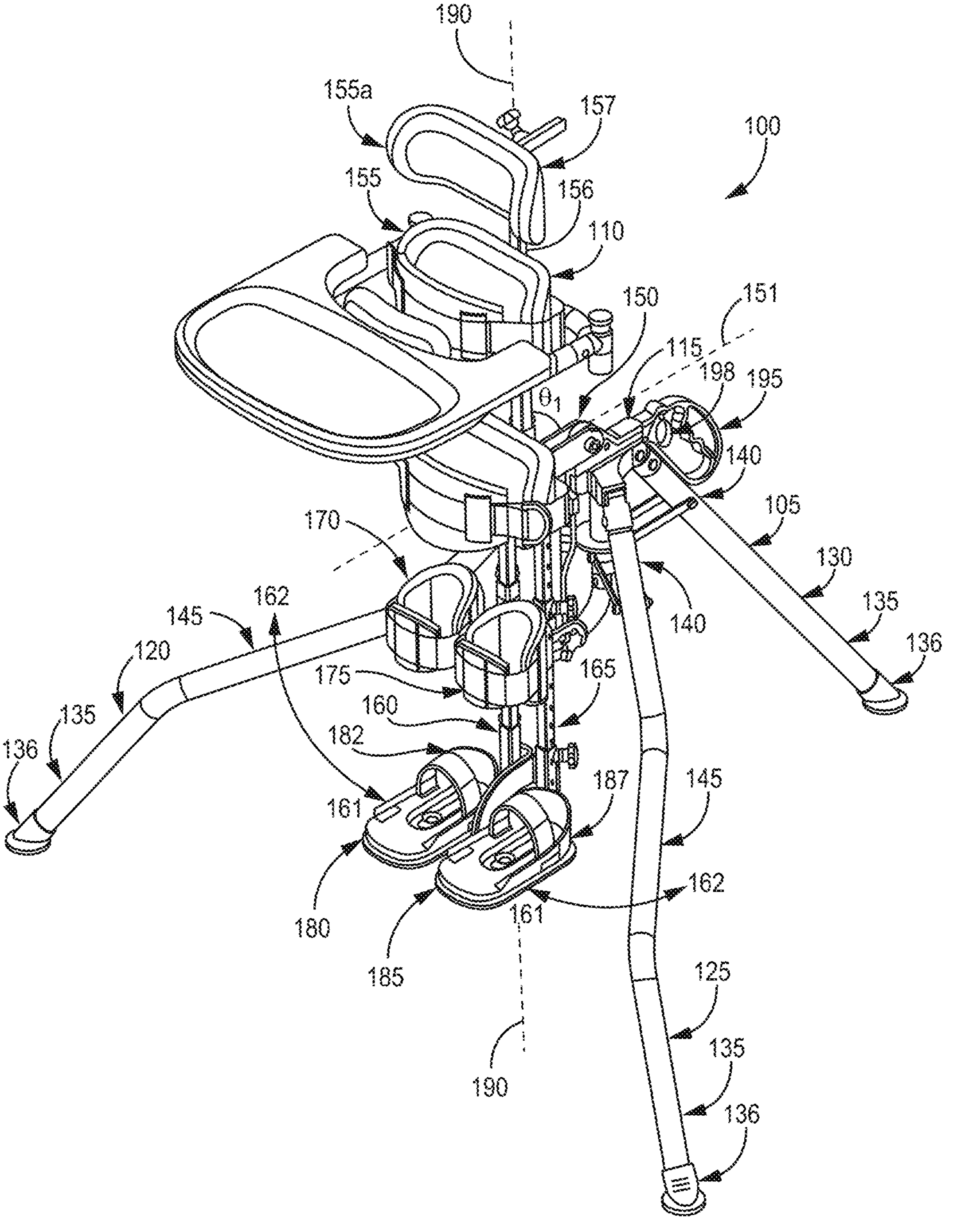
FIG. 1 is a perspective view of an embodiment of a complex rehabilitation technology system.
Figure 4:
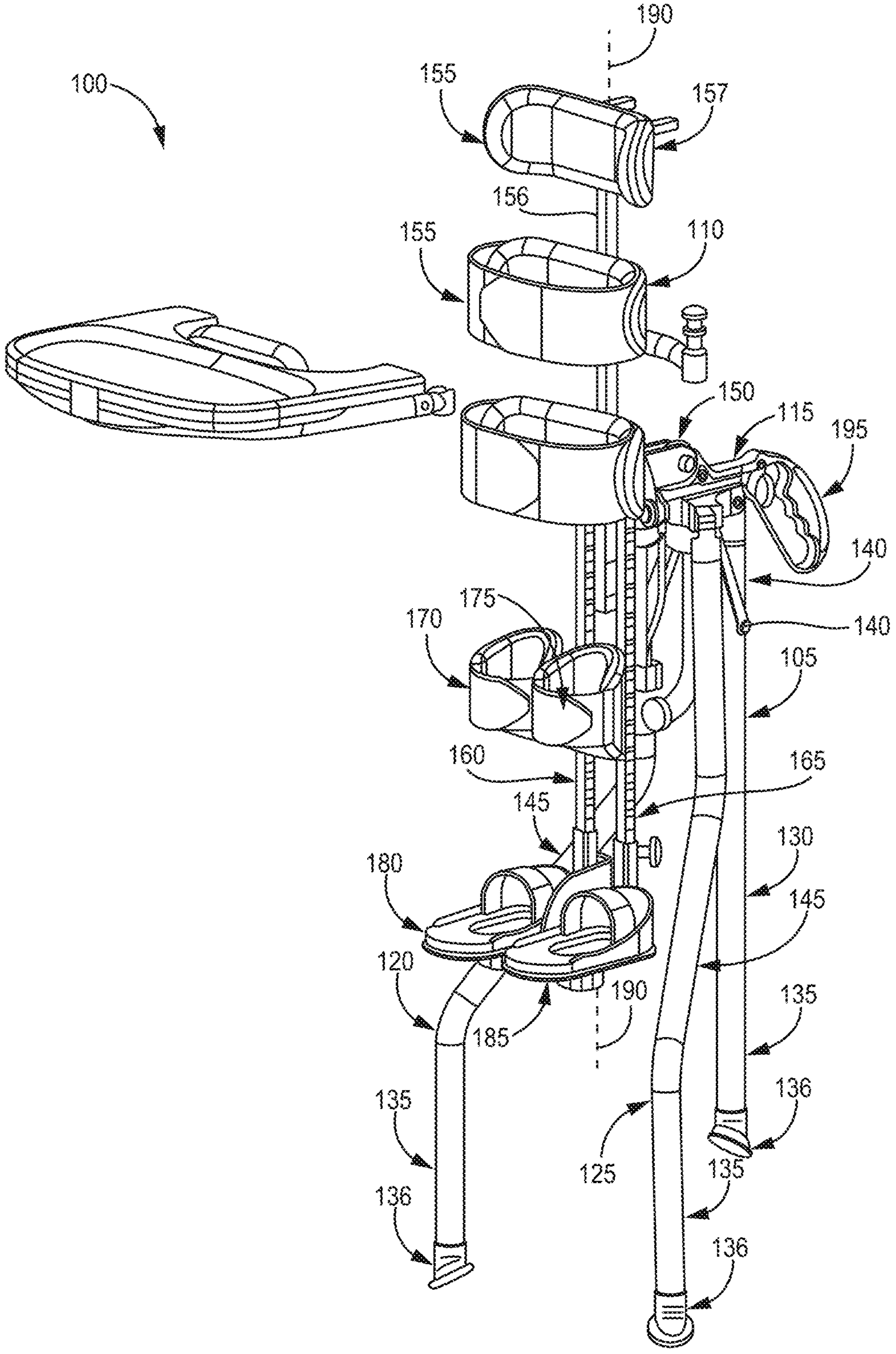
FIG. 4 is a perspective view of the complex rehabilitation technology system of FIG. 1 but with the frame in a collapsed carriable position.

FIG. 1 illustrates an embodiment of a complex rehabilitation technology system 100. The complex rehabilitation technology system 100 can include a frame 105 and a complex rehabilitation technology device 110. The frame 105 can be movable between a collapsed carriable position and an expanded support position. FIG. 1 shows the frame 105 in an exemplary expanded support position (FIG. 4 shows the frame 105 in an exemplary collapsed carriable position). The complex rehabilitation technology device 110 can be coupled to the frame 105. And, the complex rehabilitation technology device 110 can be operable when the frame 105 is in the expanded support position, for instance as shown in FIG. 1.

The illustrated exemplary embodiment of the frame 105 forms a tripod that includes a tripod base 115, a first leg 120, a second leg 125, and a third leg 130. The complex rehabilitation technology device 110 is coupled to the tripod base 115. One or more of the first leg 120, the second leg 125, and the third leg 130 can be hingedly attached to the tripod base 115 such that the one or more hingedly attached legs can move relative to the tripod base 115. For example, in the illustrated embodiment of the frame 105 each of the first leg 120, the second leg 125, and the third leg 130 are hingedly attached to the tripod base 115.

Each of the first leg 120, the second leg 125, and the third leg 130 can include a lower end portion 135 and an upper end portion 140 that is opposite the lower end portion 135. The upper end portion 140 of each leg 120, 125, 130 can be attached to the tripod base 115. Namely, in the illustrated embodiment, the upper end portion 140 of each of the first leg 120, the second leg 125, and the third leg 130 is hingedly attached to the tripod base 115 via a hinged connection point at the upper end portion 140. The lower end portion 135 of each leg 120, 125, 130 can include a foot 136 that is configured to support the complex rehabilitation technology system 100 at a support surface (e.g., a ground surface), for instance when the frame 105 is in the expanded support position. As shown in FIG. 1, the lower end portion 135 of the first leg 120, the lower end portion 135 of the second leg 125, and the lower end portion 135 of the third leg 130 can form an isosceles triangle when the frame 105 is in the expanded support position. Thus, for the embodiment of the frame 105 illustrated here, two of the legs 120, 125, 130 can be of the same length while the remaining leg 120, 125, 130 is a different length than the other two. In the example shown here, the first leg 120 and the second leg 125 are of the same length, while the third leg 130 is of a different (e.g., shorter) length than the first leg 120 and the second leg 125.

As also shown in FIG. 1, the first leg 120 and the second leg 125 can each include an angled region 145 between the lower end portion 135 and the upper end portion 140. This angled region 145 can be configured to create a clearance space at the frame 105 for the complex rehabilitation technology device 110 to operate, for instance when the frame 105 is in the expanded support position, such as shown in FIG. 1. As one example, the angled region 145 can facilitate movement of one or more components of the complex rehabilitation technology device 110 over each of the first leg 120 and the second leg 125 at the angled region 145 thereof. One specific such example can include movement of a leg support (e.g., between an adducted position and an abducted position) of the complex rehabilitation technology device 110 over one of the first leg 120 and the second leg 125 at the angled region 145.

Figure 9:
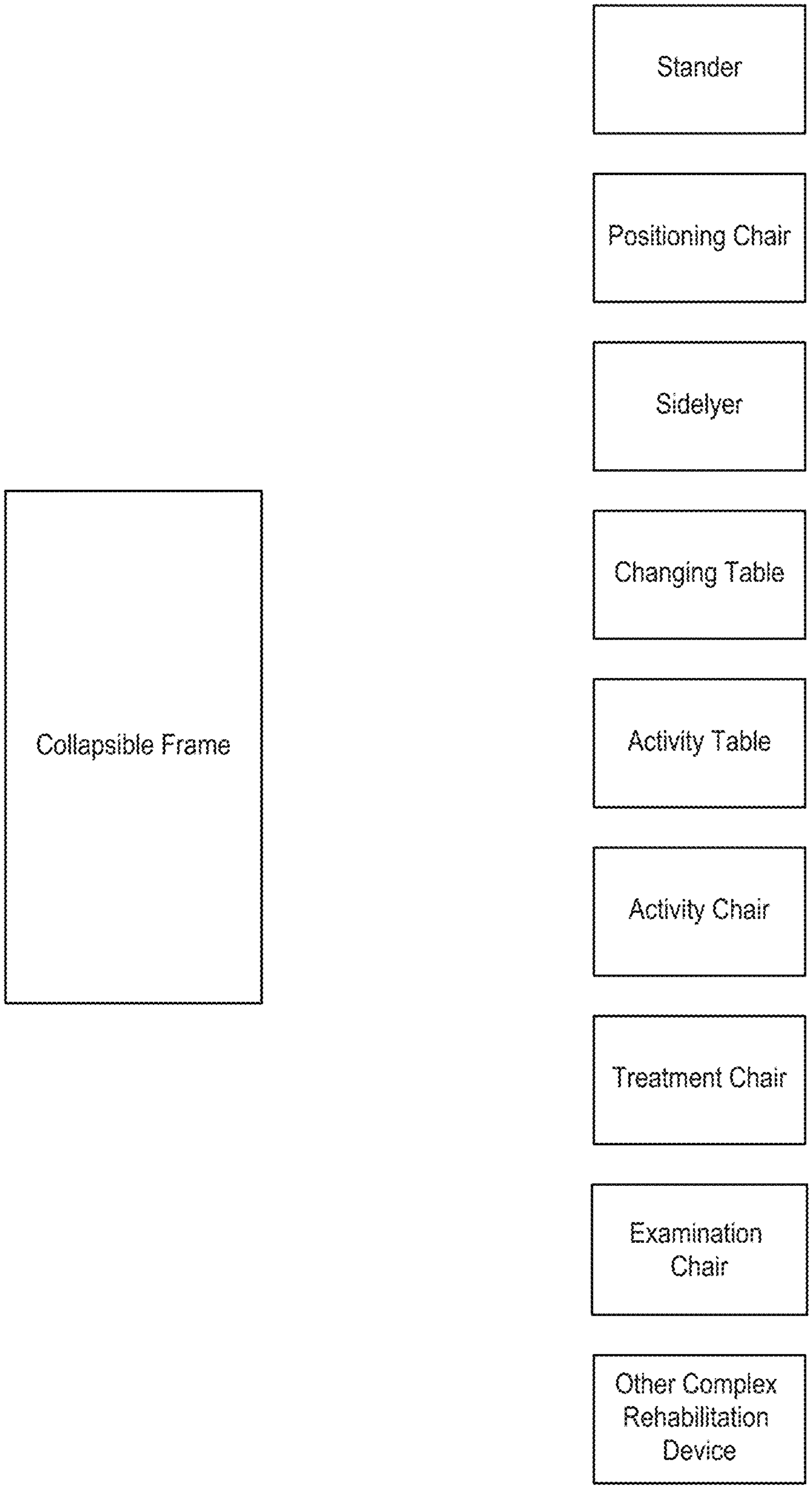
FIG. 9 is a schematic diagram showing complex rehabilitation technology devices that can be incorporated into carriable complex rehabilitation technology systems.

In the illustrated embodiment, the complex rehabilitation technology device 110 comprises a stander device. Where the complex rehabilitation technology device 110 comprises a stander device, such as in the illustrated embodiment, the complex rehabilitation technology system 100 can be referred to as a portable stander system. However, in other embodiments of the complex rehabilitation technology system 100, the complex rehabilitation technology device 110 can include various other types of complex rehabilitation technology devices. FIG. 9 shows other types of complex rehabilitation technology devices that can be used as the complex rehabilitation technology device 110 in the complex rehabilitation technology system 100, including a positioning chair, a sidelayer, a changing table, an activity table, an activity chair, a treatment chair, or an examination chair. The preceding list is illustrative, and other types of complex rehabilitation technology devices can also be used with the frame 105 to form a complex rehabilitation technology system within the scope of the present disclosure.

In the embodiment of FIGS. 1-4 where the complex rehabilitation technology device 110 is a stander device, the stander device can be coupled to the frame 105, and the stander device can be configured to be operable when the frame 105 is in the expanded support position, such as that shown in FIG. 1. The stander device can include a stander base 150, a trunk support 155, a first leg support 160, a second leg support 165, a first knee support 170, a second knee support 175, a first foot support 180, and a second foot support 185. The stander base 150 can be coupled to the frame 105. The trunk support 155 can be coupled to the stander base 150, for instance at a trunk support shaft 156 of the trunk support 155. The first leg support 160 can be coupled to the stander base 150, and the second leg support 165 can be coupled to the stander base 150. The first knee support 170 can be coupled to the first leg support 160, and the second knee support 175 can be coupled to the second leg support 165. The first foot support 180 can be coupled to the first leg support 160, and the second foot support 185 can be coupled to the second leg support 165.

In many instances, the trunk support 155 (and trunk support shaft 156) may be easily removably coupled to the stander base 150. When the complex rehabilitation technology system 100 is in a collapsed carriable position, the trunk support 155 may be coupled to the stander base 150 for a user to carry the complex rehabilitation technology system 100. A user may disassemble the complex rehabilitation technology system 100 for storage and transport. For example, the user may remove the trunk support 155 from the stander base 150 for storage and transport. In this manner, for storage and transport, the complex rehabilitation technology system 100 may have multiple distinct components—e.g., the trunk support 155 and the frame 105 combined with the other stander device components (stander base 150, first leg support 160, second leg support 165, first knee support 170, second knee support 175, first foot support 180, and second foot support 185). In some embodiments, as discussed elsewhere herein, the complex rehabilitation technology system 100 may include the frame 105 combined with the other stander device components, along with multiple trunk supports 155 removed from the frame 105 and other stander device components (e.g., supine trunk support **155*a* of FIGS. 1, 2, and 4 and prone trunk support 155*b* of FIG. 3**). In this way, a care provider may be able to easily store and transport a portable stander device that facilitates both supine and prone standing treatments.

The illustrated embodiment of the trunk support 155 shown in FIG. 1 is a supine trunk support **155*a*. One feature of the supine trunk support 155*a*, as shown in the illustrated embodiment, is a head rest 157. The supine trunk support 155*a* can be configured to support a patient at the complex rehabilitation technology system 100 in one or more supine positions. The supine trunk support 155*a* can be removably coupled to the stander base 150 when the complex rehabilitation technology system 100 is desired to be used to support a patient in one or more supine positions. In this way, the supine trunk support 155*a* can be removed from the stander base 150 so that, for instance, a different trunk support, configured for supporting the patient at the complex rehabilitation technology device 110 in one or more positions other than a supine position, can be coupled to the stander base 150** (e.g., a prone trunk support, as described elsewhere herein).

In the illustrated stander device embodiment, one or more components of the stander device can be movable between two or more positions to facilitate various anatomical orientations. For example, each of the first leg support 160 and the second leg support 165 can be configured to move between an adducted position 161 and an abducted position 162. In FIG. 1, each of the first leg support 160 and the second leg support 165 is shown in the adducted position 161. When desired, each of the first leg support 160 and the second leg support 165 can be moved from the adducted position 161 to the abducted position 162, for instance by pivoting each of the first leg support 160 and the second leg support 165 relative to the stander base 150. Depending on the extent of the abducted position 162, the first leg support 160 and the second leg support 165 can move over the angled region 145 of the respective first leg 120 and second leg 125 when moving to the abducted position 162.

Also in the illustrated stander device embodiment, each of the first foot support 180 and the second foot support 185 can be configured to move between a supine foot support position and a prone foot support position. FIG. 1 shows each of the first foot support 180 and the second foot support 185 in an exemplary supine foot support position. For example, the first foot support 180 can include a first heel support 182 that is configured to move (e.g., rotate) about the first foot support 180 to the supine foot support position associated with the supine trunk support **155*a*, and the second foot support 185 can include a second heel support 187 that is configured to move (e.g., rotate) about the second foot support 185 to the supine foot support position associated with the supine trunk support 155*a*. In this way, when the complex rehabilitation technology system 100 is to be used to support a patient in one or more supine positions, the supine trunk support 155*a* can be coupled to the stander base 150 and each of the first foot support 180 and the second foot support 185 can be positioned in the supine foot support position associated with the supine trunk support 155*a***.

In the illustrated embodiment where the complex rehabilitation technology device 110 is a stander device, the stander device can be configured to be movable between multiple positions. For example, the stander device can be configured to be movable between a loading position and a standing position. The stander device can define a trunk axis 190, for instance extending longitudinally along the trunk support 155. The trunk axis 190 can be closer to vertical when the stander device is in the standing position than when the stander device is in the loading position. FIG. 1 shows the stander device in one exemplary standing position. For example, the standing position of the stander device shown in FIG. 1 can be an exemplary supine standing position. The stander base 150 can define a stander base central horizontal plane 151 (e.g., that extends through the stander base 150 and runs parallel to the frame base 115). In many instances, the stander base 150 can be generally horizontal. When the stander device is in the standing position, the trunk axis 190 can form an angle $\Theta_1$ with the stander base central horizontal plane 151 that is slightly greater than or slightly less than 90 degrees. In some instances, angle $\Theta_1$ may be approximately 90 degrees.

To move the stander device between various positions, the complex rehabilitation technology system 100 can include an actuator 198. For example, when actuated, the actuator 198 can enable the stander device to move between the loading position and the standing position. As shown in the illustrated embodiment, the complex rehabilitation technology system 100 can include a handle 195, and the actuator 198 can be adjacent to, or positioned at, the handle 195. For instance, the handle 195 can be included at the frame 105, and the handle 195 can include the actuator 198. In one example, the actuator 198 can take the form of a trigger mechanism that is configured to be actuated by applying a force at (e.g., pulling the) actuator 198. When the force is applied at the actuator 198, the standing device can be unlocked so as to be freely movable relative to the frame base 115, for instance between loading and standing positions.

Figure 2:
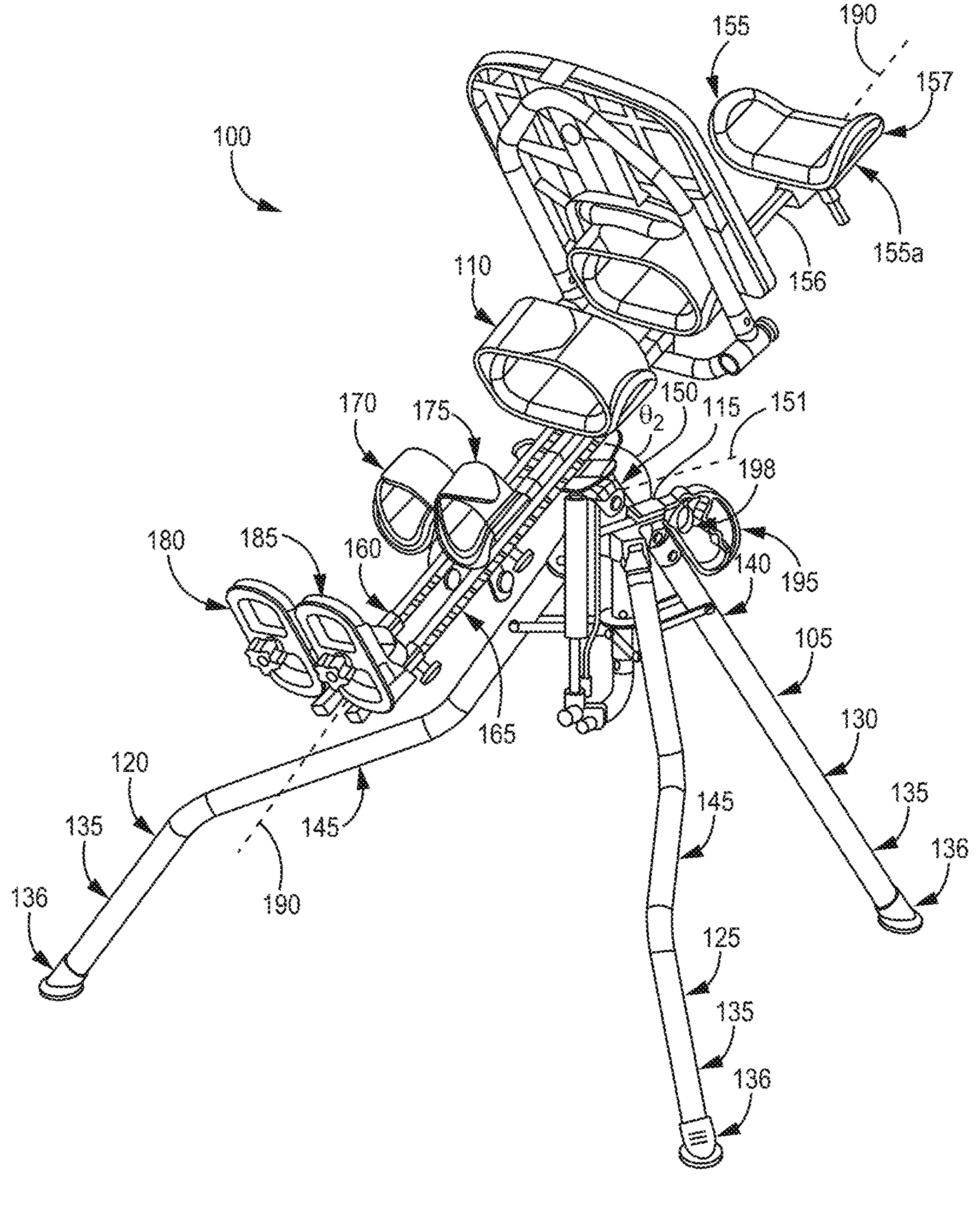
FIG. 2 is a perspective view of the complex rehabilitation technology system of FIG. 1 with a complex rehabilitation technology device shown in a loading position.

FIG. 2 shows the complex rehabilitation technology device 110, in this case the stander device, in one exemplary loading position. For example, the loading position of the stander device shown in FIG. 2 can be an exemplary supine loading position. When the stander device is in the supine loading position, the trunk axis 190 can form an angle $\Theta_2$ with the stander base central horizontal plane 151 that is less than that angle $\Theta_1$ when the stander device is in the standing position. In other words, the trunk axis 190 can be moved closer to the frame base 115 when the stander device is moved from the standing position to the supine loading position. The angle $\Theta_2$ formed when the stander device is in the supine loading position, can range between 0 and 90 degrees, such as between 15 and 75 degrees, or between 30 and 60 degrees.

As noted, the actuator 198 can be actuated to move the stander device between the supine standing position and the supine loading position. For instance, the stander device can be movable (e.g., manually) relative to the frame base 115 when the actuator 198 is actuated (e.g. when the actuator 198 has a force applied thereat) and then lock in place when the actuator 198 is no longer actuated (e.g., when the force is no longer applied thereat). The frame 105 can remain in the expanded support position as the complex rehabilitation technology device 110 moves between the supine standing position and supine loading position.

Figure 3:
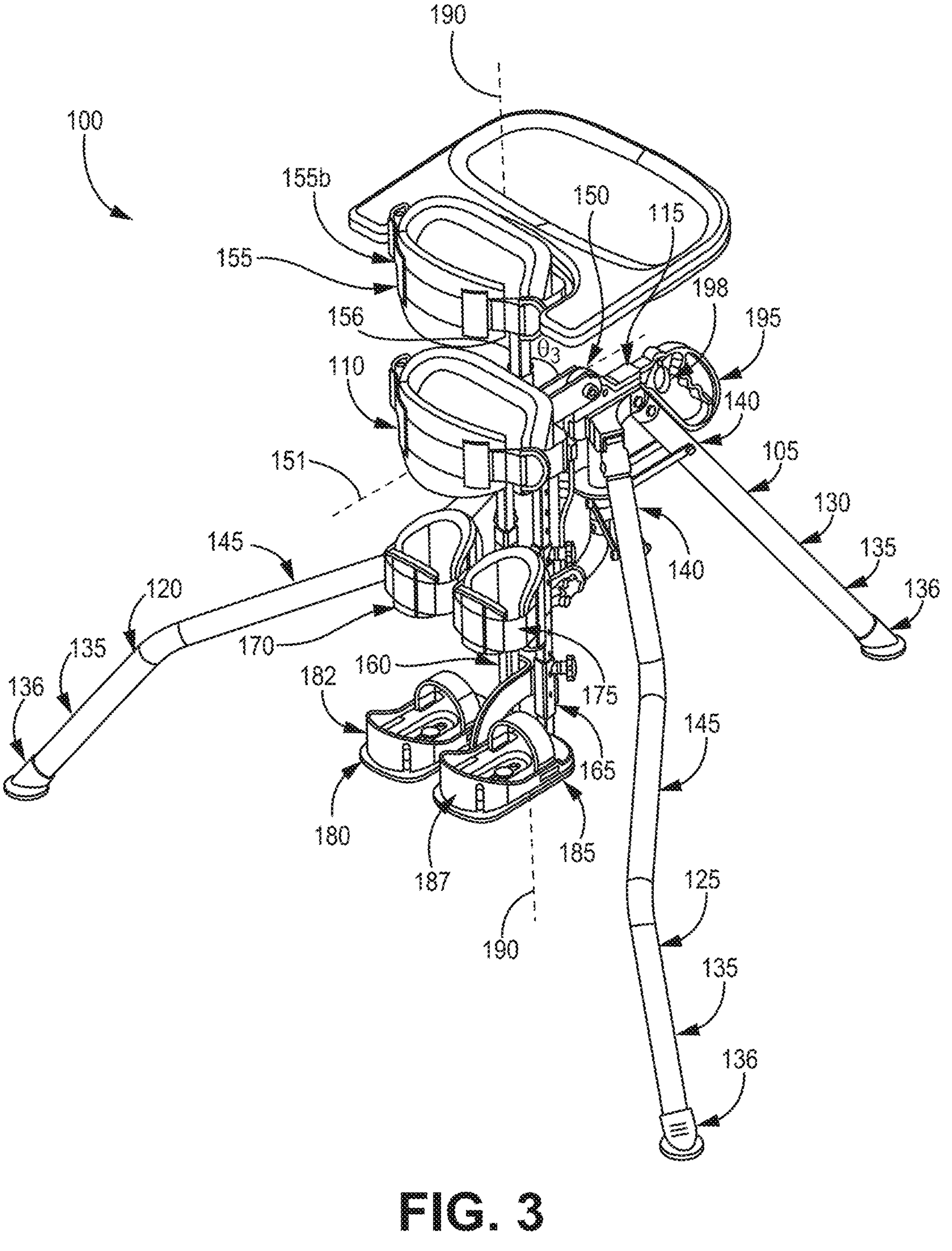
FIG. 3 is a perspective view of the complex rehabilitation technology system of FIG. 1 with a complex rehabilitation technology device shown in a generally vertical standing position.

FIG. 3 shows the complex rehabilitation technology system 100 with the complex rehabilitation technology device 110 configured for use in one or more prone positions. As noted, the trunk support 155 can be removably coupled to the stander base 150 such that the trunk support 155 can be removed and a different trunk support can be coupled to the stander base 150. FIG. 3 shows the trunk support 155 as a prone trunk support 155*b*. The prone trunk support 155*b*, as shown in the illustrated embodiment, does not have the head rest as does the illustrated embodiment of the supine trunk support 155*a*. The prone trunk support 155*b* can be configured to support a patient at the complex rehabilitation technology system 100 in one or more prone positions. The prone trunk support 155*b* can be removably coupled to the stander base 150 when the complex rehabilitation technology system 100 is desired to be used to support a patient in one or more prone positions. In this way, the prone trunk support 155*b* can be removed from the stander base 150 so that, for instance, a different trunk support, configured for supporting the patient at the complex rehabilitation technology device 110 in one or more positions other than a prone position, can be coupled to the stander base 150. For instance, the supine trunk support 155*a*, shown in FIGS. 1 and 2, can be removed from the stander base 150, and the prone trunk support 155*b*, shown in FIG. 3, can be coupled to the stander base 150 when the complex rehabilitation technology system 100 is desired to be used to support a patient in one or more prone positions.

As noted, in the illustrated stander device embodiment, each of the first foot support 180 and the second foot support 185 can be configured to move between foot support positions, including between a supine foot support position and a prone foot support position. FIG. 3 shows each of the first foot support 180 and the second foot support 185 in an exemplary prone foot support position. For example, the first foot support 180 can include a first heel support 182 that is configured to move (e.g., rotate) about the first foot support 180 to the prone foot support position associated with the prone trunk support 155*b*, and the second foot support 185 can include a second heel support 187 that is configured to move (e.g., rotate) about the second foot support 185 to the prone foot support position associated with the prone trunk support 155*b*. In this way, when the complex rehabilitation technology system 100 is to be used to support a patient in one or more prone positions, the prone trunk support 155*b* can be coupled to the stander base 150 and each of the first foot support 180 and the second foot support 185 can be positioned in the prone foot support position associated with the prone trunk support 155*b*. As can be seen, for instance in FIGS. 1 and 3, the prone foot support position and the supine foot support position can be defined as rotational positions of the heel supports 182, 187 at the respective foot supports 180, 185 approximately 180 degrees apart.

As noted, the complex rehabilitation technology device 110 can be configured to be movable between multiple positions. FIG. 3 shows the complex rehabilitation technology device 110, in this case the stander device with the prone trunk support 155*b*, in one exemplary prone standing position. When the stander device is in the standing position, the trunk axis 190 can form an angle $\Theta_3$ with the stander base central horizontal plane 151 that is slightly greater than or slightly less than 90 degrees. The stander device can also have a vertical standing position (angle $\Theta_3$ is 90 degrees). When the stander device is in the vertical standing position, the trunk axis 190 can be generally perpendicular to a support surface (e.g., a ground surface) on which the complex rehabilitation technology system 100 is positioned.

In some instances, a supine-loaded patient may be moved to a vertical standing position and beyond. FIGS. 11A-11D show four illustrative positions for such a supine-loaded patient. A trunk axis 590, which would extend generally through a patient's trunk when loaded in the stander device, is shown for purposes of illustration. A stander base central horizontal plane 551, which would extend generally horizontally through the center of the stander base, is also shown for purposes of illustration. The trunk axis 590 forms an angle $\Theta$ with the stander base central horizontal plane 551, and angle $\Theta$ changes as the stander moves through various positions.

Figure 11A:
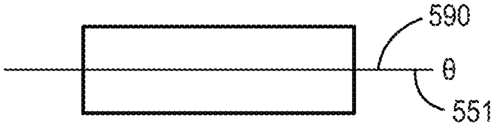
FIGS. 11A-11D are schematic diagrams of a supine-loaded patient being moved through various positions.

FIG. 11A shows the supine loading position. In many instances, the angle $\Theta$ can be close to zero degrees when in the supine loading position. In some embodiments, the angle $\Theta$ is greater than zero degrees when in the supine loading position (e.g., up to 30 degrees, up to 45 degrees, etc.). Optimal supine loading position may depend on the particular patient, the particular care provider, and/or a variety of factors.

Figure 11B:
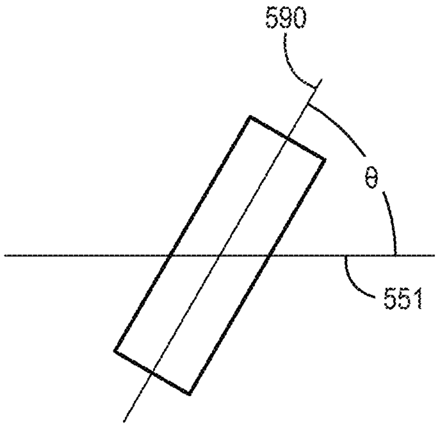
Figure 11C:
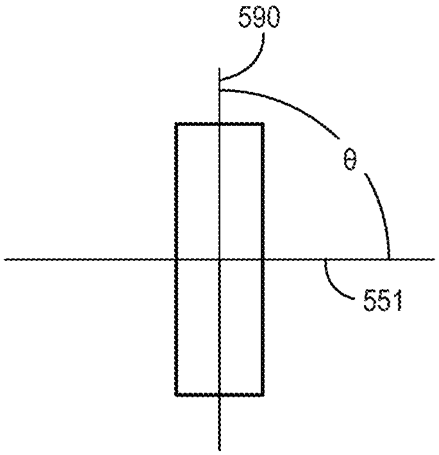
Figure 11D:
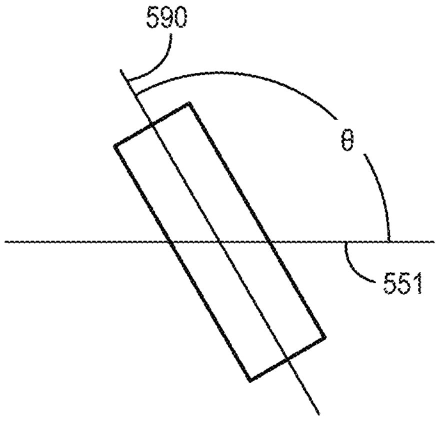

When the patient is safely loaded in the stander device, he or she may be moved into various standing positions. FIG. 11B shows the stander device in a supine standing position. In the supine standing position, the angle $\Theta$ can be between 45 degrees and 90 degrees (e.g., 60-90 degrees). FIG. 11C shows the stander device in a vertical standing position. In the vertical standing position, the angle $\Theta$ can be approximately 90 degrees (e.g., vertical). FIG. 11D shows the stander device in a prone standing position. In the prone standing position, the angle $\Theta$ can be greater than 90 degrees. For example, the angle $\Theta$ can be between 90 degrees and 135 degrees (e.g., 90-120 degrees). As shown in FIGS. 11A-11D, the angle $\Theta$ is less than 90 degrees in the supine standing position and greater than 90 degrees in the prone standing position. In some embodiments, the stander device may move the supine-loaded patient into a prone position in which the angle $\Theta$ approaches 180 degrees (e.g., 160-180 degrees). In some embodiments, a prone-loaded patient may likewise be moved through various positions similar to those discussed herein. In some embodiments, the stander device may move the patient (supine-loaded or prone-loaded) to an inverted position (e.g., angle $\Theta$ is 180-360 degrees).

To selectively provide a relatively more compact footprint, the frame 105 can be movable to the collapsed carriable position. FIG. 4 shows one exemplary collapsed carriable position of the frame 105. Specifically, the frame 105 can be moved from the expanded support position, shown in FIGS. 1-3, to the collapsed carriable position shown in FIG. 4. In this way, the frame 105 can facilitate increased portability of the complex rehabilitation technology system 100.

To move between the expanded support position and the collapsed carriable position, at least two of the first leg 120, the second leg 125, and the third leg 130 can be movable relative to the tripod base 115 between the collapsed carriable position and the expanded support position. The first leg 120, the second leg 125, and the third leg 130 can be spaced further apart when in the expanded support position than when in the collapsed carriable position, such as that shown in FIG. 4. For example, in one embodiment of the frame 105, the first leg 120 and the second leg 125 can be movable (e.g., pivotable) relative to the tripod base 115 between the collapsed carriable position and the expanded support position. In such an embodiment of the frame 105, when the frame 105 is moved toward the collapsed carriable position, the lower end portion 135 of each of first leg 120 and the second leg 125 can be brought closer to the tripod base 115 than when in the expanded support position. In another embodiment of the frame 105, each of the first leg 120, the second leg 125, and the third leg 130 can be movable (e.g., pivotable) relative to the tripod base 115 between the collapsed carriable position and the expanded support position. In such an embodiment of the frame 105, when the frame 105 is moved toward the collapsed carriable position, the lower end portion 135 of each of first leg 120, the second leg 125, and the third leg 130 can be brought closer to the tripod base 115 than when in the expanded support position.

The ability of the frame 105 to move to the collapsed carriable position can provide a more compact footprint of the frame 105 as well as the complex rehabilitation technology system 100. This, in turn, can lead to increased portability of and thereby increase utilization of the complex rehabilitation technology system 100.

As a result of the frame 105 being movable to the collapsed carriable position, the complex rehabilitation technology system 100 can be configured for one-handed carrying. For example, as noted previously, the frame 105 can include the handle 195, and the handle 195 can facilitate one-handed carrying of the complex rehabilitation technology system 100. In some embodiments, the complex rehabilitation technology system may weigh no more than a carriable weight (e.g., no more than 50 pounds, no more than 60 pounds, no more than 70 pounds, etc.). In the embodiment illustrated in FIG. 4, the complex rehabilitation technology device 110 is in the form of a stander device and, as such, the complex rehabilitation technology system 100 can be referred to here as a portable stander system. The portable stander system can be configured for one-handed carrying via the handle 195. More specifically, the portable stander system can be configured for one-handed carrying via the handle 195 when the frame 105 is in the collapsed carriable position, such as that shown in FIG. 4. Thus, the stander device itself can be configured for one-handed carrying via the handle 195 when the frame 105 is in the collapsed carriable position. And, the stander device can be configured to be operable when the frame 105 is in the expanded support position.

Figure 10:
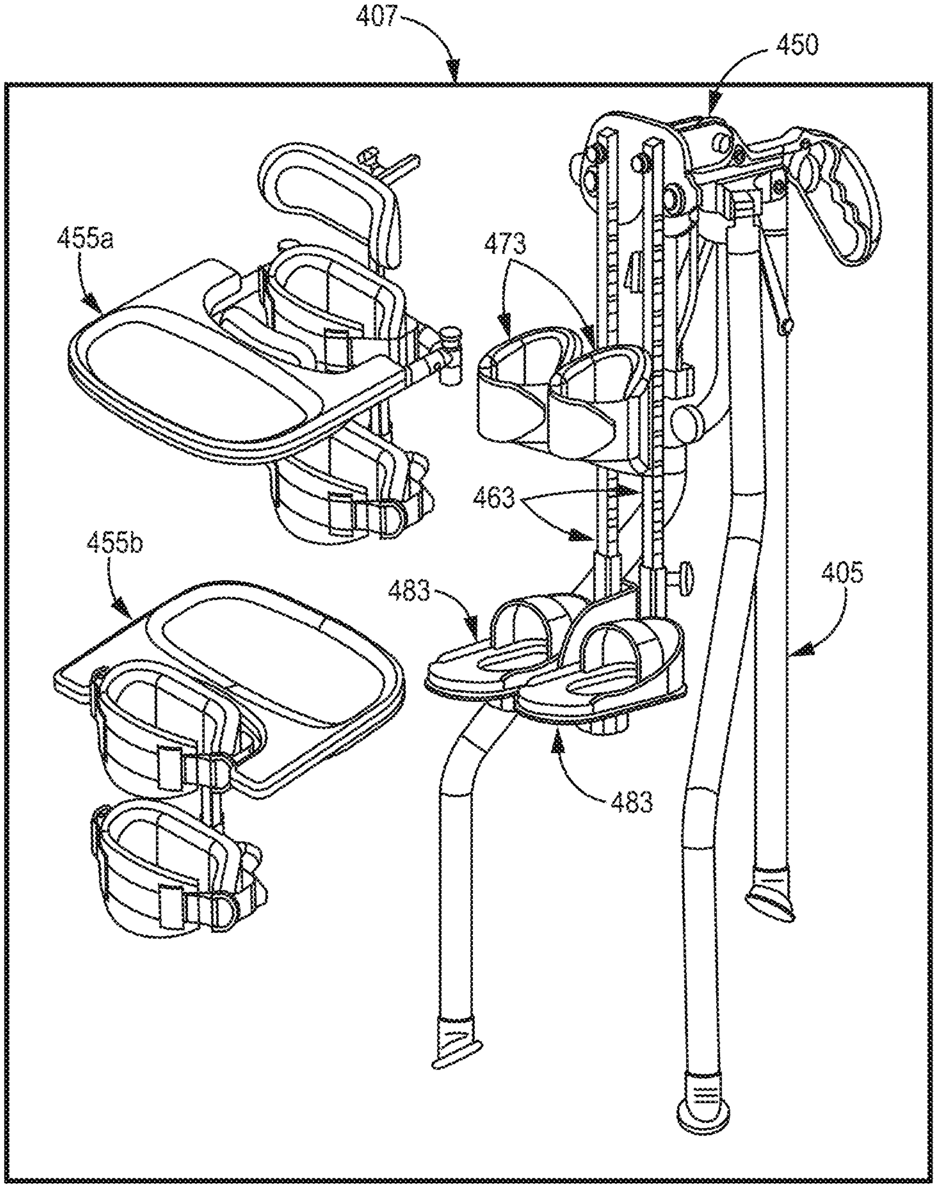
FIG. 10 is a perspective view of a complex rehabilitation technology system and a package for storage and transport.

The relatively more compact footprint resulting from the frame 105 moving to the collapsed carriable position can facilitate increased portability of the complex rehabilitation technology system 100 from one location to another. For example, in embodiments in which the CRT device comprises a portable stander system, the frame 105 can be collapsible to fit the frame 105 and the portable stander system within an interior volume of a package of 150 liters or less, 125 liters or less, 100 liters of less, 80 liters or less, or 60 liters or less. For instance, in the case of the frame 105 being collapsible to fit the frame 105 and the portable stander system within an interior volume of a package of 100 liters, this would mean the frame 105 is collapsible to fit the frame 105 and the portable stander system within an interior volume of a package having dimensions of, for instance, 32 inches (e.g., length)×16 inches (e.g., width)×12 inches (e.g., height). In many embodiments, the portable stander system can include a stander base that is coupled to the frame and that holds leg supports, knee supports, and foot supports. The portable stander can also include supine and prone trunk supports that are each removably coupled to the stander base. As shown in FIG. 10, the frame 405 and stander base 450 (with attached leg supports 463, knee supports 473, and foot supports 483), the supine trunk support **455*a*, and the prone trunk support 455*b* may all fit within the specified interior volume of the package 407**.

The exemplary embodiment of the collapsible frame 105 illustrated and described up to this point forms a tripod. However, other embodiments of collapsible frames, to which the complex rehabilitation technology device 110 can be coupled to form the complex rehabilitation technology system 100, are within the scope of the present disclosure.

Figure 5:
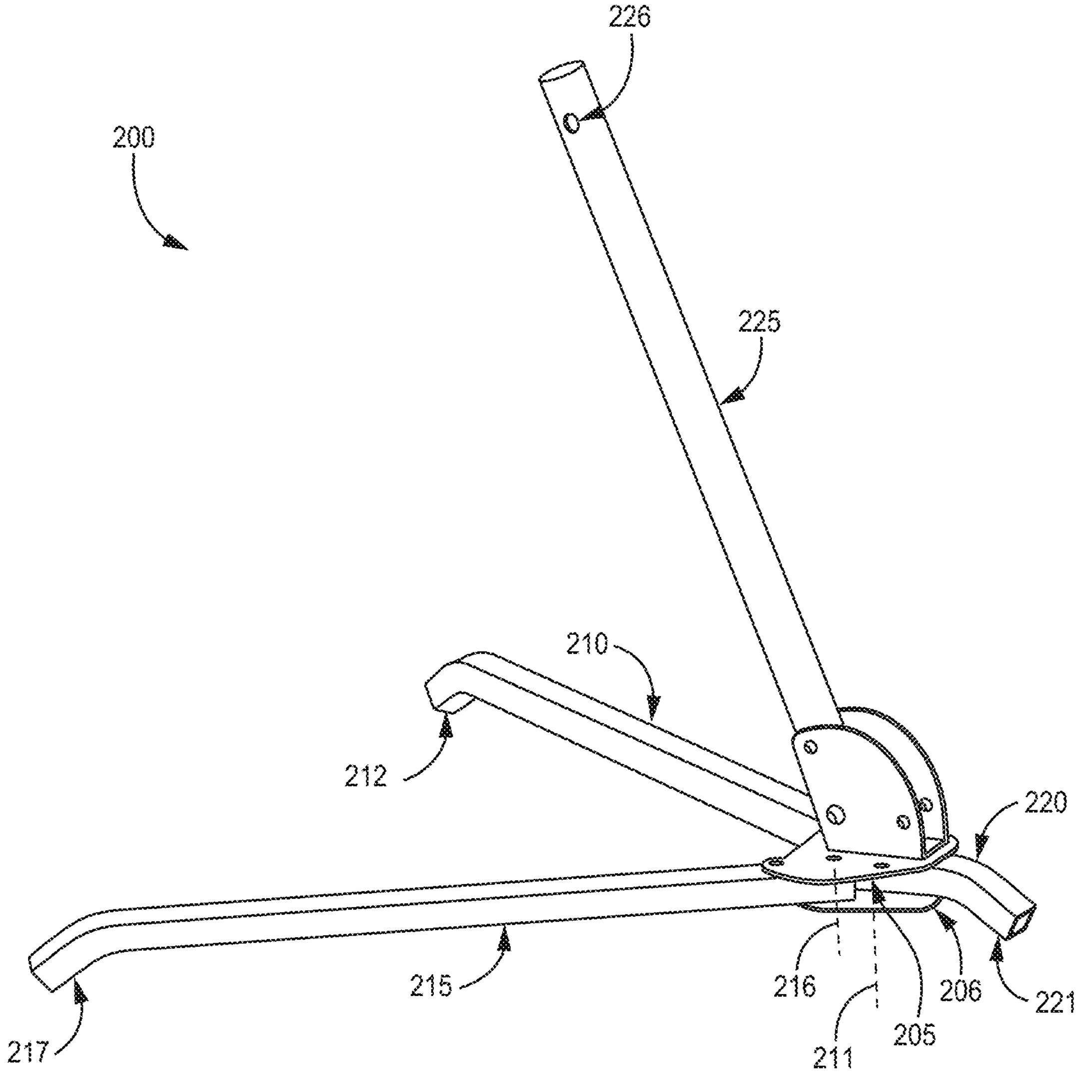
FIG. 5 is a perspective view of another embodiment of a frame that can be used as part of a complex rehabilitation technology system, with the frame shown in an expanded support position.
Figure 6:
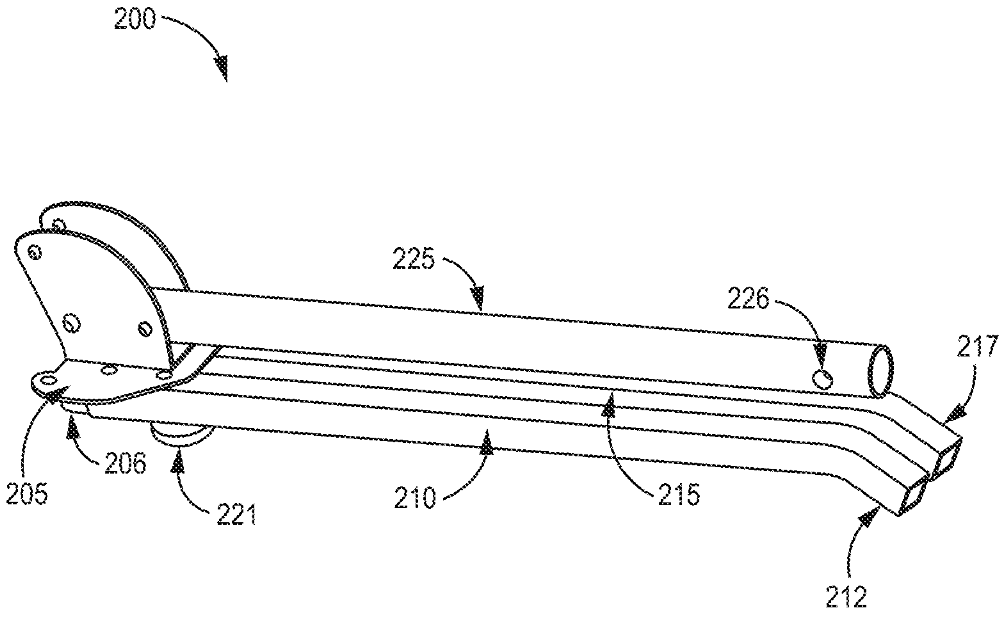
FIG. 6 is a perspective view of another embodiment of a frame that can be used as part of a complex rehabilitation technology system, with the frame shown in a collapsed carriable position.

FIGS. 5 and 6 illustrate similar embodiments of a frame 200 that can be included as part of the complex rehabilitation technology system 100. The frame 200 is movable between a collapsed carriable position and an expanded support position. FIG. 5 shows the frame 200 in an exemplary expanded support position, and FIG. 6 shows the frame 200 in an exemplary collapsed carriable position. The complex rehabilitation technology device 110 can be coupled to the frame 200, and the complex rehabilitation technology device 110 can be configured to be operable when the frame 200 is in the expanded support position.

The frame 200 includes a base 205, a first generally horizontal leg 210, a second generally horizontal leg 215, and a third generally horizontal leg 220. In the illustrated embodiment, the third generally horizontal leg 220 is shorter than each of the first generally horizontal leg 210 and the second generally horizontal leg 215. Also in the illustrated embodiment, the first generally horizontal leg 210 and the second generally horizontal leg 215 are of approximately equal length. The first generally horizontal leg 210 can be pivotally coupled to the base 205 about a first pivot axis 211, and the second generally horizontal leg 215 can be pivotally coupled to the base 205 about a second pivot axis 216. The third generally horizontal leg 220 can be coupled to the base 205, though, unlike the first and second generally horizontal legs 210, 215, in the illustrated embodiment of the frame 200 the third generally horizontal leg 220 may be fixedly coupled to the base 205. The base 205 can include a base foot 206, the first generally horizontal leg 210 can include a first foot 212, the second generally horizontal leg 215 can include a second foot 217, and the third generally horizontal leg 220 can include a third foot 221.

The frame 200 can further include a support coupling 225 via which the complex rehabilitation technology device 110 can be coupled to the frame 200. The support coupling 225 can be pivotally coupled to the base 205. The support coupling 225 can include a coupling mechanism 226 that is configured to couple to the complex rehabilitation technology device 110 (e.g., via the stander base 150).

As noted, the frame 200 is movable between a collapsed carriable position and an expanded support position. The complex rehabilitation technology device 110 can be configured to be operable when the frame 200 is in the expanded support position. For example, the first generally horizontal leg 210 and the second generally horizontal leg 215 can be movable relative to the base 205 between the expanded support position, shown in FIG. 5, and the collapsed carriable position, shown in FIG. 6. In the illustrated embodiment, each of the first generally horizontal leg 210 and the second generally horizontal leg 215 can pivot relative to the base 205 about the respective pivot axis 211, 216 between the expanded support position and the collapsed carriable position. Likewise, the support coupling 225 can be movable relative to the base 205 between the expanded support position, shown in FIG. 5, and the collapsed carriable position, shown in FIG. 6. In the illustrated embodiment, the support coupling 225 can pivot relative to the base 205 between the expanded support position and the collapsed carriable position.

FIG. 6 shows the frame 200 in the collapsed carriable position. As shown here, the first generally horizontal leg 210 and the second generally horizontal leg 215 can be spaced closer together in the collapsed carriable position than in the expanded support position. When moved to the collapsed carriable position, the first generally horizontal leg 210, the second generally horizontal leg 215, and the support coupling 225 can each be pivoted about the base 205 toward the third generally horizontal leg 220. In this way, when in the collapsed carriable position, each of the first generally horizontal leg 210, the second generally horizontal leg 215, the third generally horizontal leg 220, and the support coupling 225 can be adjacent one another. As shown in FIG. 6, when in the collapsed carriable position, the first generally horizontal leg 210 can be on one side of the third generally horizontal leg 220, the second generally horizontal leg 215 can be on an opposite side of the third generally horizontal leg 220, and the support coupling 225 can be positioned over the third generally horizontal leg 220. As a result, the collapsed carriable position of the frame 200 can provide a more compact footprint.

Figure 7:
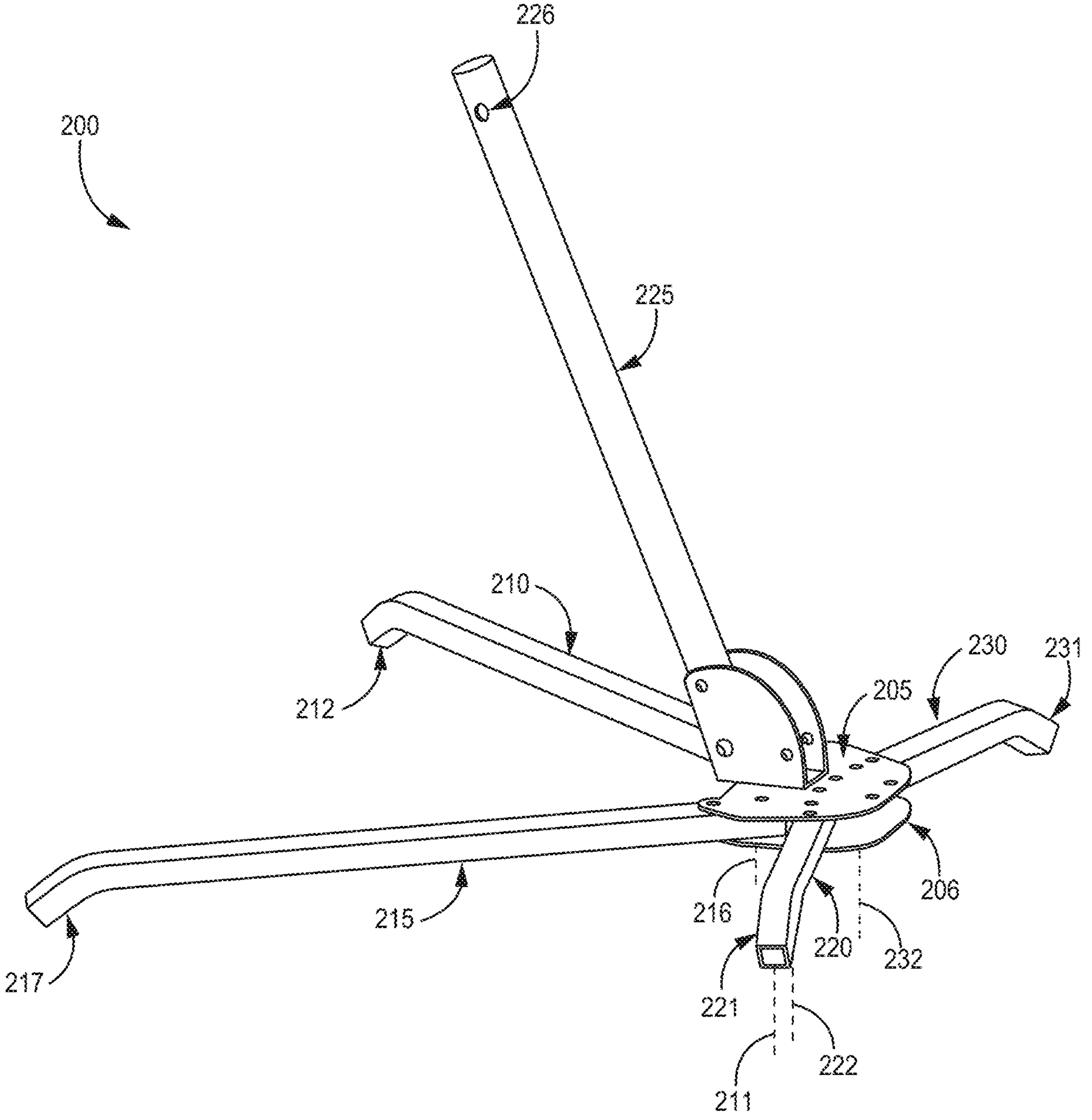
FIGS. 7 and 8 are perspective views of a further embodiment of a frame that can be used as part of a complex rehabilitation technology system.
Figure 8:
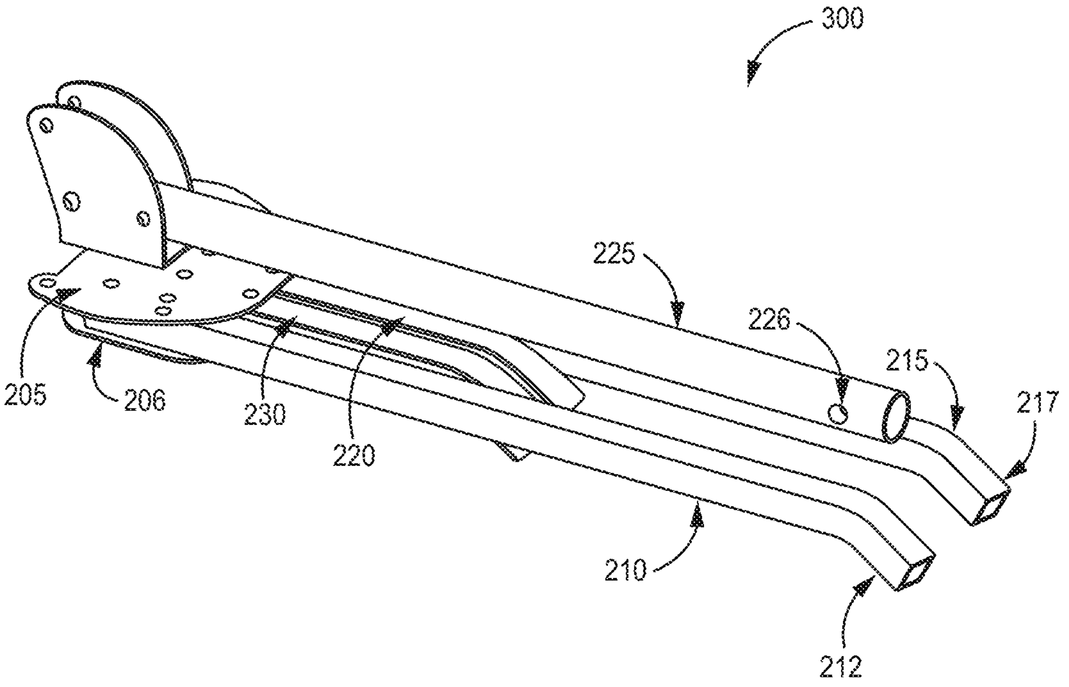

FIGS. 7 and 8 illustrate another embodiment of a frame 300 that can be included as part of the complex rehabilitation technology system 100. The frame 300 is movable between a collapsed carriable position and an expanded support position. FIG. 7 shows the frame 300 in an exemplary expanded support position, and FIG. 8 shows the frame 300 in an exemplary collapsed carriable position. The complex rehabilitation technology device 110 can be coupled to the frame 300, and the complex rehabilitation technology device 110 can be configured to be operable when the frame 300 is in the expanded support position.

The frame 300 can be similar to, or the same as, the frame 200 except as otherwise described here.

The frame 300 includes the base 205, the first generally horizontal leg 210, the second generally horizontal leg 215, the third generally horizontal leg 220, and a fourth generally horizontal leg 230. In the illustrated embodiment, each of the third generally horizontal leg 220 and the fourth generally horizontal leg 230 is shorter than each of the first generally horizontal leg 210 and the second generally horizontal leg 215. Also in the illustrated embodiment, the first generally horizontal leg 210 and the second generally horizontal leg 215 are of approximately equal length, and the third generally horizontal leg 220 and the fourth generally horizontal leg 230 are of approximately equal length. The first generally horizontal leg 210 can be pivotally coupled to the base 205 about the first pivot axis 211, and the second generally horizontal leg 215 can be pivotally coupled to the base 205 about the second pivot axis 216. Likewise, the third generally horizontal leg 220 can be pivotally coupled to the base 205 about a third pivot axis 222, and the fourth generally horizontal leg 230 can be pivotally coupled to the base 205 about a fourth pivot axis 232. The base 205 can include the base foot 206, the first generally horizontal leg 210 can include the first foot 212, the second generally horizontal leg 215 can include the second foot 217, the third generally horizontal leg 220 can include a third foot 221, and the fourth generally horizontal leg 230 can include a fourth foot 231.

As noted, the frame 300 is movable between a collapsed carriable position and an expanded support position. The complex rehabilitation technology device 110 can be configured to be operable when the frame 300 is in the expanded support position. For example, the first generally horizontal leg 210 and the second generally horizontal leg 215 can be movable relative to the base 205 between the expanded support position, shown in FIG. 7, and the collapsed carriable position, shown in FIG. 8. In the illustrated embodiment, each of the first generally horizontal leg 210 and the second generally horizontal leg 215 can pivot relative to the base 205 about the respective pivot axis 211, 216 between the expanded support position and the collapsed carriable position. Also in the illustrated embodiment, the third generally horizontal leg 220 and the fourth generally horizontal leg 230 can be movable relative to the base 205 between the expanded support position, shown in FIG. 7, and the collapsed carriable position, shown in FIG. 8. In the illustrated embodiment, each of the third generally horizontal leg 220 and the fourth generally horizontal leg 230 can pivot relative to the base 205 about the respective pivot axis 222, 232 between the expanded support position and the collapsed carriable position. Likewise, the support coupling 225 can be movable (e.g., pivotable) relative to the base 205 between the expanded support position, shown in FIG. 7, and the collapsed carriable position, shown in FIG. 8.

FIG. 8 shows the frame 300 in the collapsed carriable position. As shown here, the first generally horizontal leg 210 and the second generally horizontal leg 215 can be spaced closer together in the collapsed carriable position than in the expanded support position. And, as shown here, the third generally horizontal leg 220 and the fourth generally horizontal leg 230 can be spaced closer together in the collapsed carriable position than in the expanded support position. When moved to the collapsed carriable position, each of the first generally horizontal leg 210, the second generally horizontal leg 215, the third generally horizontal leg 220, the fourth generally horizontal leg 230, and the support coupling 225 can be pivoted about the base 205 toward each other.

In this way, when in the collapsed carriable position, each of the first generally horizontal leg 210, the second generally horizontal leg 215, the third generally horizontal leg 220, the fourth generally horizontal leg 230, and the support coupling 225 can be adjacent one another. As shown in FIG. 8, when in the collapsed carriable position, the first generally horizontal leg 210 can be on (e.g., contacting) one side of the third generally horizontal leg 220. Also, as shown in FIG. 8, when in the collapsed carriable position, the second generally horizontal leg 215 can be on (e.g., contacting) one side of the fourth generally horizontal leg 230. Further, when in the collapsed carriable position shown in FIG. 8, the third generally horizontal leg 220 and the fourth generally horizontal leg 230 can brought toward one another such that the respective side of each, opposite the respective leg 220, 230, can interface (e.g., contact) with one another. And, when in the collapsed carriable position shown in FIG. 8, the support coupling 225 can be positioned over the third generally horizontal leg 220 and/or the fourth generally horizontal leg 230. As a result, the collapsed carriable position of the frame 200 can provide a more compact footprint.

Various examples have been described. These and other examples are within the scope of the following claims.

What is claimed is:

1. A complex rehabilitation technology system comprising:

a frame that is movable between a collapsed carriable position and an expanded support position, the frame comprising a tripod, the tripod comprising:

a tripod base;

a first leg hingedly attached to the tripod base via a first hinged connection point;

a second leg hingedly attached to the tripod base via a second hinged connection point; and a third leg hingedly attached to the tripod base via a third hinged connection point, each of the first leg, second leg, and third leg being individually movable relative to the tripod base; and a complex rehabilitation technology device coupled to the frame, the complex rehabilitation technology device configured to be operable when the frame is in the expanded support position, wherein the complex rehabilitation technology device comprises a stander device, the stander device comprising: a stander base coupled to the frame; a trunk support coupled to the stander base; a first leg support coupled to the stander base and a second leg support coupled to the stander base; a first knee support coupled to the first leg support and a second knee support coupled to the second leg support; and a first foot support coupled to the first leg support and a second foot support coupled to the second leg support.

2. The complex rehabilitation technology system of claim 1, wherein the first leg, the second leg, and the third leg are movable relative to the tripod base between the collapsed carriable position and the expanded support position, and wherein the first leg, the second leg, and the third leg are spaced further apart when in the expanded support position than when in the collapsed carriable position.

3. The complex rehabilitation technology system of claim 1, wherein each of the first leg, the second leg, and the third leg includes a lower end portion and an opposite upper end portion that is attached to the tripod base, the lower end portion of the first leg, the lower end portion of the second leg, and the lower end portion of the third leg forming an isosceles triangle when the frame is in the expanded support position.

4. The complex rehabilitation technology system of claim 3, wherein the first leg and the second leg each include an angled region between the lower end portion and the upper end portion, the angled region configured to create a clearance space at the frame for the complex rehabilitation technology device to operate when the frame is in the expanded support position.

5. The complex rehabilitation technology system of claim 1, wherein the first leg comprises a first generally horizontal leg that is pivotably coupled to the base about a first pivot axis; and the second leg comprises a second generally horizontal leg that is pivotably coupled to the base about a second pivot axis.

6. The complex rehabilitation technology system of claim 5, wherein the third leg comprises a third generally horizontal leg coupled to the base, the third generally horizontal leg being shorter than each of the first and second generally horizontal legs, wherein the first generally horizontal leg includes a first foot, the second generally horizontal leg includes a second foot, and the third generally horizontal leg includes a third foot.

7. The complex rehabilitation technology system of claim 1, wherein each of the first leg support and the second leg support is configured to move between an adducted position and an abducted position.

8. The complex rehabilitation technology system of claim 1, wherein the stander device defines a trunk axis, the stander device being movable between a loading position and a standing position, the trunk axis being closer to vertical when the stander device is in the standing position than when the stander device is in the loading position.

9. The complex rehabilitation technology system of claim 8, further comprising:

a handle that includes an actuator that when actuated enables the stander device to move between the loading position and the standing position.

10. The complex rehabilitation technology system of claim 1, wherein the stander device defines a trunk axis, the stander device being movable between a supine loading position, a supine standing position, a vertical standing position, and a prone standing position, the trunk axis forming an angle with a stander base central horizontal plane that is less than 90 degrees in the supine standing position and greater than 90 degrees in the prone standing position.

11. The complex rehabilitation technology system of claim 1, wherein the trunk support comprises a supine trunk support that is removably coupled to the stander base, and wherein the first foot support includes a first heel support that is configured to move about the first foot support to a supine foot support position associated with the supine trunk support and the second foot support includes a second heel support that is configured to move about the second leg support to the supine foot support position associated with the supine trunk support.

12. The complex rehabilitation technology system of claim 1, wherein the trunk support comprises a prone trunk support that is removably coupled to the stander base, and wherein the first foot support includes a first heel support that is configured to move about the first foot support to a prone foot support position associated with the prone trunk support and the second foot support includes a second heel support that is configured to move about the second foot support to the prone foot support position associated with the prone trunk support.

13. The complex rehabilitation technology system of claim 1, wherein the complex rehabilitation technology device comprises a positioning chair, a sidelayer, a changing table, an activity table, an activity chair, a treatment chair, or an examination chair.

14. The complex rehabilitation technology system of claim 1, wherein the frame comprises a handle that facilitates one-handed carrying of the complex rehabilitation technology system.

15. A portable stander system comprising:

a frame that is movable between a collapsed carriable position and an expanded support position, the frame comprising:

a tripod base;

a handle;

a first leg hingedly attached to the tripod base;

a second leg hingedly attached to the tripod base; and a third leg hingedly attached to the tripod base, each of the first leg, second leg, and third leg being individually movable relative to the tripod base; and a stander device coupled to the frame, the stander device being configured to be operable when the frame is in the expanded support position, wherein the stander device further comprises: a stander base coupled to the frame; a supine trunk support that is removably couplable to the stander base; and a prone trunk support that is removably couplable to the stander base, wherein the portable stander system is configured for one-handed carrying via the handle when the frame is in the collapsed carriable position.

16. The portable stander system of claim 15, wherein the frame is collapsible to fit the portable stander system within an interior volume of a package of 100 liters.

17. The portable stander system of claim 15, wherein the first leg is hingedly attached to the tripod base via a first hinged connection point, the second leg is hingedly attached to the tripod base via a second hinged connection point, and the third leg is hingedly attached to the tripod base via a third hinged connection point.

* * * * *